(12) United States Patent
Lebowsky et al.

(10) Patent No.: US 6,609,073 B1
(45) Date of Patent: Aug. 19, 2003

(54) ELECTRONIC DEVICE FOR CALCULATING THE TIME INTERVAL BETWEEN SUCCESSIVE TRANSITIONS OF AN INCIDENT SIGNAL

(75) Inventors: Fritz Lebowsky, Corps d'Uriage (FR); Sonia Marrec, Meylan (FR)

(73) Assignee: STMicroelectronics SA, Gentilly (FR)

( * ) Notice: Subject to any disclaimer, the term of this patent is extended or adjusted under 35 U.S.C. 154(b) by 287 days.

(21) Appl. No.: 09/693,181

(22) Filed: Oct. 20, 2000

(30) Foreign Application Priority Data

Oct. 28, 1999 (FR) .............................. 99 13523

(51) Int. Cl.[7] ................................................ G04F 8/00
(52) U.S. Cl. ........................ 702/69; 702/79; 702/176; 368/89
(58) Field of Search .......................... 702/69, 79, 176, 702/177, 178, 80, 89; 369/59.2, 59.19, 59.1, 47.31–47.34, 47.3, 47.29, 47.28, 30.22, 30.21, 30.11, 47.33, 53.34; 365/189.08, 220, 221; 368/89, 118, 120

(56) References Cited

U.S. PATENT DOCUMENTS

| | | | | |
|---|---|---|---|---|
| 3,683,285 A | * | 8/1972 | Wild | 327/3 |
| 4,165,459 A | * | 8/1979 | Curtice | 368/119 |
| 4,497,048 A | | 1/1985 | Kimura | 369/46 |
| 4,583,209 A | | 4/1986 | Bierhoff | 369/46 |
| 4,943,926 A | * | 7/1990 | Guzman-Edery et al. | 702/79 |
| 4,982,350 A | * | 1/1991 | Perna et al. | 702/89 |
| 5,132,948 A | * | 7/1992 | Ishibashi | 369/44.34 |
| 5,612,938 A | * | 3/1997 | Dohmeier et al. | 369/47.32 |
| 6,097,674 A | * | 8/2000 | Swapp | 368/113 |
| 6,269,062 B1 | * | 7/2001 | Minemura et al. | 369/47.53 |

FOREIGN PATENT DOCUMENTS

EP 1037204 9/2000 ............ G11B/7/09

OTHER PUBLICATIONS

Patent Abstracts of Japan, vol. 018, No. 473 (P–1795), Sep. 2, 1994 & JP 06 150354 A (Sanyo Seiki Mfg. Co. Ltd.), May 31, 1994.

* cited by examiner

Primary Examiner—Marc S. Hoff
Assistant Examiner—Jeffrey R West
(74) Attorney, Agent, or Firm—Lisa K. Jorgenson; Allen, Dyer, Doppelt, Milbrath & Gilchrist, P.A.

(57) ABSTRACT

A device for calculating a time gap between successive transitions of an incident signal includes an input stage which detects and selects transitions of an incident signal and calculates the time gap between each selected transition and an edge of a sampling clock signal. An assemblage of at least three blocks is also included. Each of the blocks includes a storage cell and a counter regulated by the sampling clock signal. In response to each selected current transition, a checking circuit or processor initializes the counter of the first block of the assemblage and stores in the cell of the first block the value of the time gap corresponding to the selected current transition. The contents of a block of the assemblage may then be transferred into a next block. The time interval between two successive selected transitions is determined based upon the counter values and the time gaps.

28 Claims, 4 Drawing Sheets

ELECTRONIC DEVICE FOR CALCULATING THE TIME INTERVAL BETWEEN SUCCESSIVE TRANSITIONS OF AN INCIDENT SIGNAL

FIELD OF THE INVENTION

The invention relates to the field of digital discs, and, more particularly, to compact disks (CDs) such as Read Only Memory (ROM) disks and digital versatile disks (DVDs).

BACKGROUND OF THE INVENTION

The invention applies advantageously but not limitingly to the field of digital disks, CD-ROMs and, more particularly, to DVDs which store image data in a compressed manner. Furthermore, the invention pertains to the calculation of the time interval between successive transitions, with respect to a threshold, of a sampled incident signal.

The invention makes it possible in particular to detect a phase shift between two elementary signals emanating from photodetectors. The phase shift corresponds to a positioning error of the incident optical beam (e.g., a laser spot) illuminating a track of the disk. This positioning error is then used conventionally in a slaving loop to modify the incident optical system and to bring the optical beam back to the track and slave it thereto.

The determination of the time interval between two successive transitions of a sampled incident signal conventionally requires the use of several memories of the first-in first-out (FIFO) type to store in succession a number of samples of the signal received. Furthermore, a relatively complex management system is also required for tagging occurrences of the transitions.

SUMMARY OF THE INVENTION

The invention provides a hardware solution for calculating a time interval between two selected successive transitions of a sampled incident signal with respect to a threshold. More specifically, an electronic device is provided for calculating the time interval between two selected successive transitions of a sampled incident signal with respect to a threshold.

According to the invention, the device includes a detection and selection circuit or means able to detect and to select transitions of the incident signal. The device according to the invention makes it possible to relatively easily calculate the time interval between two successive transitions regardless of the direction of these transitions. That is, whether the signal oversteps the threshold in one direction or in the other. This being so, the detection and selection means can select rising or falling transitions of the incident signal to determine the time interval between two transitions of like direction.

The device according to the invention may further include a calculating circuit or means for calculating a time gap or phase between each selected transition and an edge of a sampling clock signal. The device may also include at least one unit or assemblage of at least three blocks, each block including a storage cell and a temporal counter regulated by the sampling clock signal. A checking circuit or means may also be provide which is able, in response to each selected current transition, to trigger an activation processing of the assemblage.

The activation processing may include initializing the temporal counter of the first block of the assemblage, storing the value of the time gap (or phase) corresponding to the selected current transition in the storage cell of the first block, and transferring the content of a block of the assemblage into a next block. Processing means are then able to determine the time interval between two successive selected transitions based upon the values of the temporal counters of the second and third blocks and of the values of the time gaps (or phases) respectively stored in the cells of the second and third blocks.

In an application for determining a mutual phase shift between two elementary signals, the device may advantageously include two assemblages of at least three blocks. Each assemblage may be respectively dedicated to transitions of opposite directions, for example. A multiplexing means or multiplexer controlled as a function of the sign of each transition detected may also be included. The successive transitions having the same direction, whether they originate from one or the other of the two elementary signals, may be processed in one of the assemblages of three blocks. On the other hand, the successive transitions having the other direction, whether they originate from one or the other of the two elementary signals, may be processed in the second assemblage.

According to the invention, a digital disk reader, such as a DVD disk reader, for example, incorporating a device as described above is also provided.

BRIEF DESCRIPTION OF THE DRAWINGS

Other advantages and characteristics of the invention will become apparent upon examining the detailed description of preferred embodiments, given by way of non-limiting example, and the appended drawings, in which.

DETAILED DESCRIPTION OF THE PREFERRED EMBODIMENTS

Figure 1:
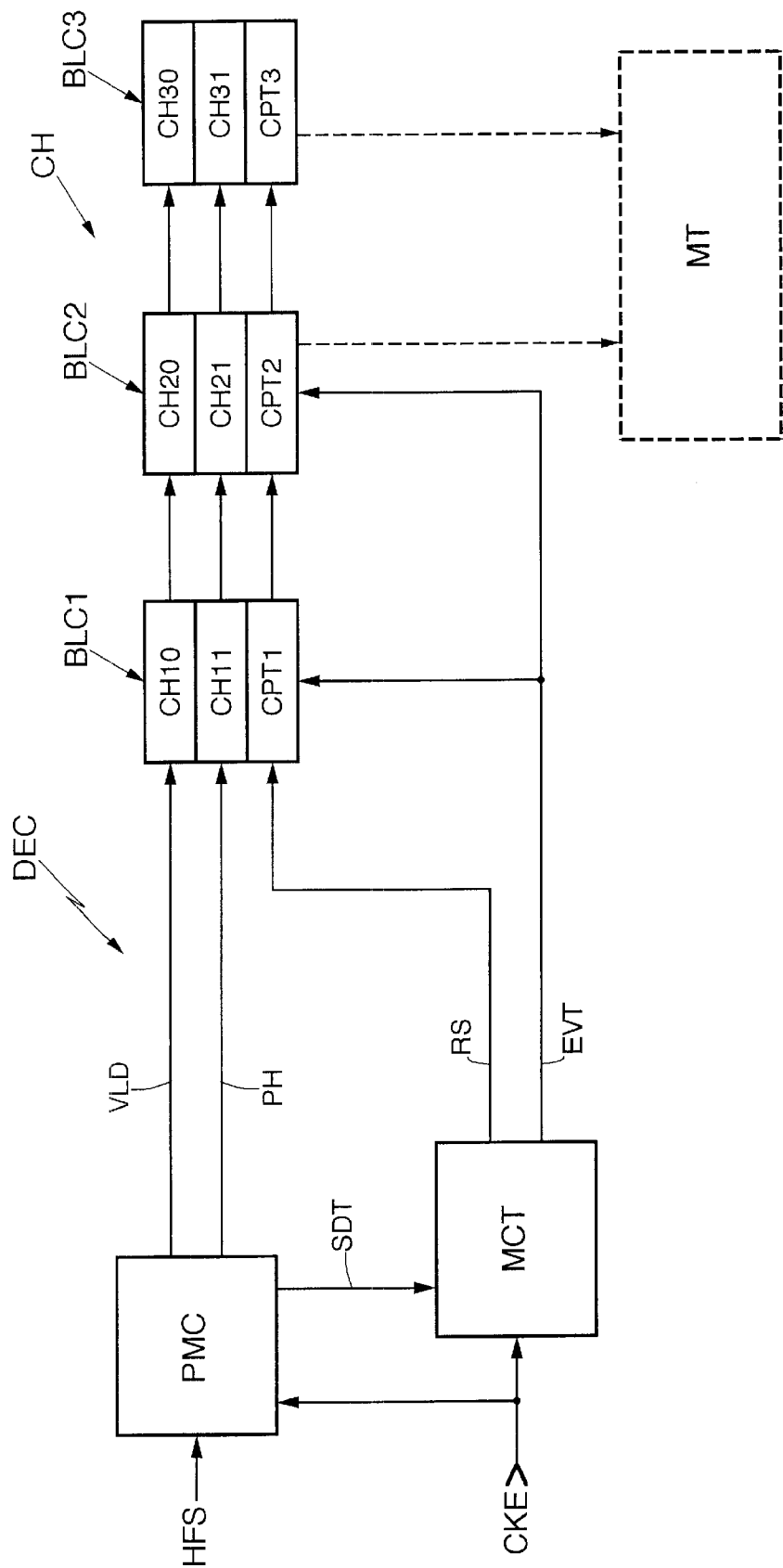
FIG. 1 is a schematic block diagram illustrating a first embodiment of a device according to the invention.
Figure 2:
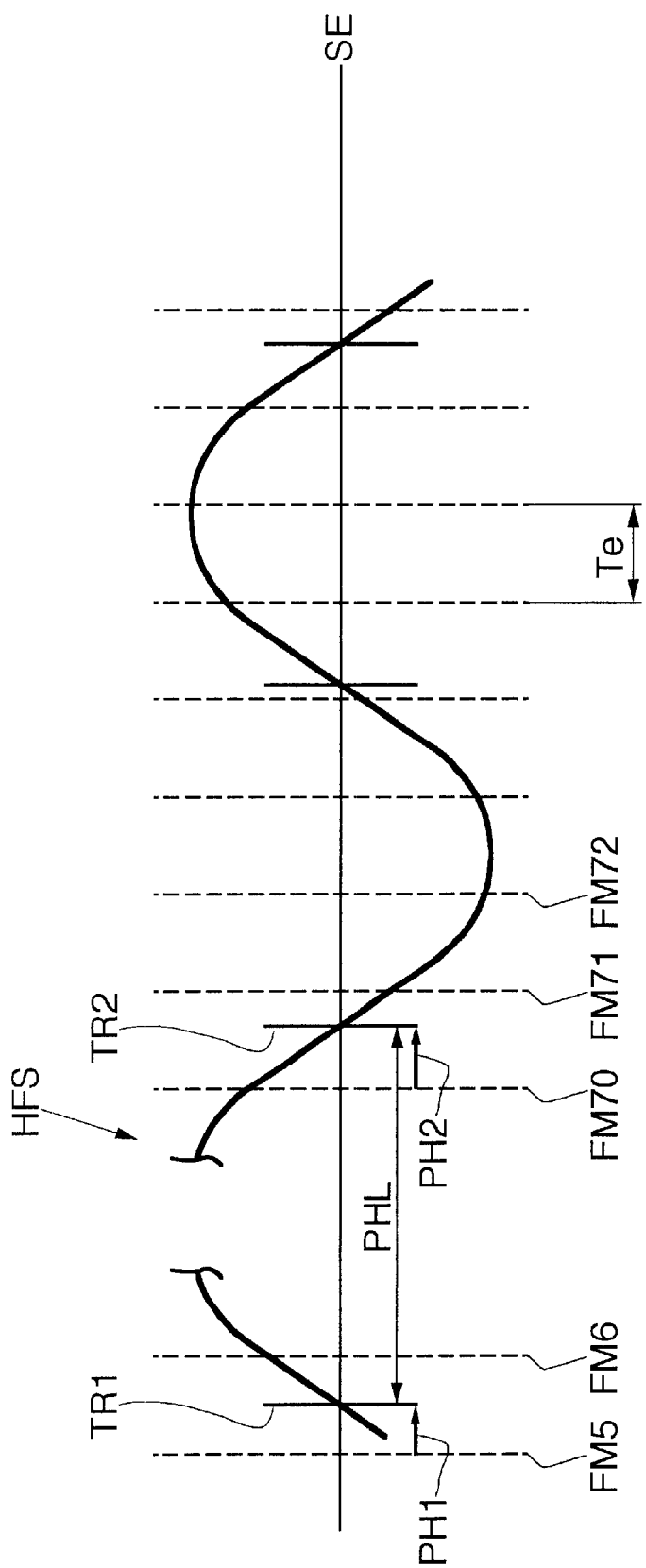
FIG. 2 is a waveform diagram illustrating the time interval between successive transitions of a sampled incident signal determined by the device of FIG. 1.

The embodiment of the device DEC illustrated in FIG. 1 makes it possible, generally speaking, to determine a time interval PHL between two successive transitions of an incident signal HFS, such as that illustrated in FIG. 2. Furthermore, this may be done irrespective of the direction of the transition with respect to the threshold SE, i.e., whether it is an overstepping of the threshold SE in the rising direction (transition TR1) or in the falling direction (transition TR2). The value of the threshold SE can be arbitrary (e.g., zero).

The device DEC has an input for receiving the incident signal HFS. This incident signal HFS is sampled by a sampling clock signal CKE having a sampling frequency Fe and a sampling period Te. As illustrated in FIG. 2, the dashed vertical lines represent rising edges of the sampling clock signal CKE. The device DEC includes an input stage PMC including a digital phase-locked loop, which may be of a type known in the art. The phase-locked loop also receives the sampling clock signal CKE and formulates an auxiliary sampling signal whose period $T_{pmc}$ is equal to Te/n, where n is an integer. The phase-locked loop detects any transition TR of the signal HFS with respect to the threshold SE and determines the interval of the auxiliary sampling signal in which the transition lies. That is, the phase-locked loop outputs a digital word representative of the distance PH (phase) between any detected transition of the signal HFS and the rising edge of the immediately preceding clock signal CKE.

In practice, the phase-locked loop typically includes 32 inverters making it possible to subdivide the period Te of the sampling clock signal into 32 intervals (n=32), for example. Thus, input stage PMC will deliver a word of five bits representing the number of the interval in which the transition is situated, i.e., the time gap between the rising edge of the sampling clock signal and the transition of the signal. As such, a digital word equal to 00000 will be representative of a transition in phase with the rising edge of the clock signal, while a digital word equal to 11111 will be representative of a transition lying just ahead of the following rising edge of the clock signal.

The input stage PMC delivers the value of each phase PH detected as well as a validation logic signal VLD. The validation logic signal VLD has the value 1 when the phase has actually been calculated before the arrival of the next sample of the signal HFS, for example. Alternatively, the validation logic signal VLD will have the logic value 0 to signify that the phase value calculated is in fact invalid. The input stage PMC moreover delivers a logic signal SDT indicative of the detection of a transition of the signal HFS. The various logic signals are conventionally produced on the basis of registers and/or logic elements such as gates, which can readily be realized by one skilled in the art.

Checking means MCT, which may be embodied in logic circuit form using logic synthesis tools or in software within a microprocessor, for example, receives the signal SDT indicative of the detection of a transition of the signal HFS. One of the functions of the checking means MCT is to trigger an activation processing of an assemblage CH formed of three blocks BLC1, BLC2 and BLC3. More specifically, each block includes a storage cell (e.g., a memory, portion of a memory, or D flip-flops) including two fields (CH10 and CH11 for block BLC1, CH20 and CH21 for block BLC2, and CH30 and CH31 for block BLC3). The two fields of each storage cell are respectively intended to store the values of the signal VLD and of the phase PH, as will be discussed further below.

Furthermore, each block includes a temporal counter (CPT1 for block BLC1, CPT2 for block BLC2, and CPT3 for block BLC3). Each of these temporal counters is synchronized with the sampling clock signal CKE. That is, it is incremented by one unit with each rising edge of a clock signal CKE. Additionally, the checking means MCT is able to deliver to the counter CPT1 of the first block BLC1 a reinitialization signal RS. The checking means MCT is also able to deliver to each of the two first blocks a transfer signal EVT in response to which, as will be seen in greater detail below, there is a transfer of the contents of block BLC1 to block BLC2.

The manner of operation of the device according to the invention will now be described in greater detail. For purposes of illustration, it will be assumed, as illustrated in FIG. 2, that a first transition TR1 of the signal HFS has been detected (detection of a change of sign) between the clock edge FM5 and the clock edge FM6. It will also be assumed that a second transition has been detected between the clock edges FM70 and FM71. For simplicity, PH1 and PH2 will respectively denote the time gaps (phases) between the transition TR1 and the rising edge FM5 on the one hand, and between the transition TR2 and the rising edge FM70 on the other hand.

Upon the occurrence (or appearance) of the clock edge FM6, the input stage PMC detects the transition TR1 (i.e., by a change of sign) and determines, between the occurrence of the rising edge FM6 and the occurrence of the rising edge FM7 (which is not shown in FIG. 2 for the sake of simplification), the value of the phase PH1 with respect to the rising edge FM5. Assuming that this phase PHi has actually been calculated before the occurrence of the rising edge FM7, the logic signal VLD takes the value 1. The phase PH1 and the logic signal VLD are respectively stored in the memories CH11 and CH10 of the storage cell of block BLC1. Furthermore, responsive to the signal SDT, which is representative of the detection of the transition TR1, the checking means MCT delivers to the counter CPT1 the reinitialization signal RS. That is, the checking means MCT reinitializes the counter CPT1 to an initial value, for example, the value 0.

When the rising edge FM7 arrives, the checking means MCT activates the logic signal EVT. As a result, the contents of block BLC1 is transferred into block BLC2, and the content of block BLC2 is transferred into block BLC3. In the present case, the value of the logic signal VLD is transferred into the memory CH20 of block BLC2. The phase PH1 is transferred into the memory CH21 of block BLC2, and the counter CPT2 therefore takes the value 0, which was that of the counter CPT1.

In synchronization with the following rising edges of the clock signal CKE, the counters CPT1, CPT2 and CPT3 will be incremented. However, the counter CPT2 will still remain shifted by one unit less compared to the counter CPT1. Thus, upon the occurrence of the rising edge FM70, the counter CPT1 has the value 64, while the counter CPT2 has the value 63. On the appearance of the rising edge FM71, the second transition TR2 is detected. This causes the rising of the transition detection signal SDT to "1" as well as the calculation of the phase PH2 with respect to the rising edge FM70. Again assuming that this phase is calculated before the occurrence of the rising edge FM72, the signal VLD associated with this phase takes the value 1. The signal VLD and the phase PH2 are therefore respectively stored in the memories CH10 and CH11 of the first block BLC1 and the counter CPT1 is reinitialized to 0, while the counter CPT2 has taken the value 64.

Upon the rising edge FM72, the logic signal EVT is activated. This causes the transfer of the content of block BLC1 into block BLC2 and the transfer of block BLC2 into block BLC3. Consequently, the memory CH31 contains the phase PH1 and the memory CH21 contains the phase PH2. Moreover, the counter CPT2 then has the value 0 and the counter CPT3 the value 64. The counter CPT1 has been incremented by one unit and therefore has the value 1.

In synchronization with the following rising edges, the counters CPT1, CPT2 and CPT3 will successively be incremented. Yet, the difference between the counters CPT3 and CPT2 will still remain equal to 64, corresponding to the 64 periods Te extending between the edge FM6 and the edge FM70. Thus, processing means MT (which can also be embodied in software form within a microcontroller, for example) can, at any instant preceding the appearance of a new transition, calculate the time interval PHL between the transitions TR1 and TR2. This is done based on the values of the temporal counters CPT2 and CPT3 and of the values PH1 and PH2 stored in the blocks BLC2 and BLC3. More precisely, in the present case, the time interval PHL will be equal to (64Te+PH2+Te−PH1).

In the example described above, all the transitions were selected, regardless of their direction. Of course, a stricter selection of the transitions could be performed in the input stage PMC and only the time intervals between transitions of like direction calculated, for example. In such a case, the selection criterion would be the direction of the transitions as determined by the change of sign (+, −or −, +) of each sample with respect to the threshold SE. FIG. 1 provides a general schematic illustration of the hardware architecture of this embodiment. Variants are possible, such as the appending of D flip-flops controlled by the clock signal CKE between the input means PMC and the block assemblage to "pipeline" the processing, for example, as will be appreciated by those of skill in the art.

Figure 3:
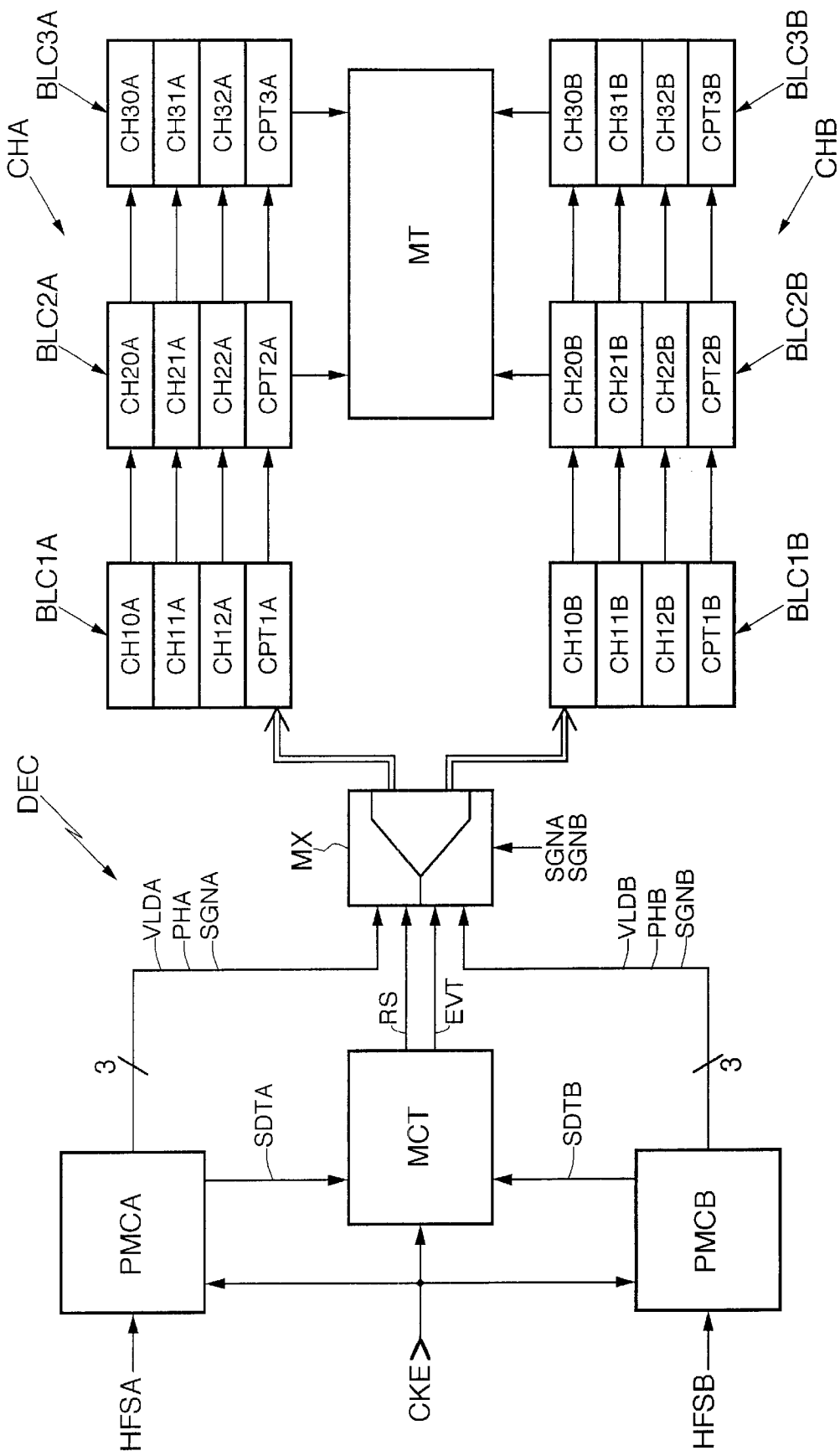
FIG. 3 is a schematic block diagram illustrating another embodiment of the device according to the invention.
Figure 4:
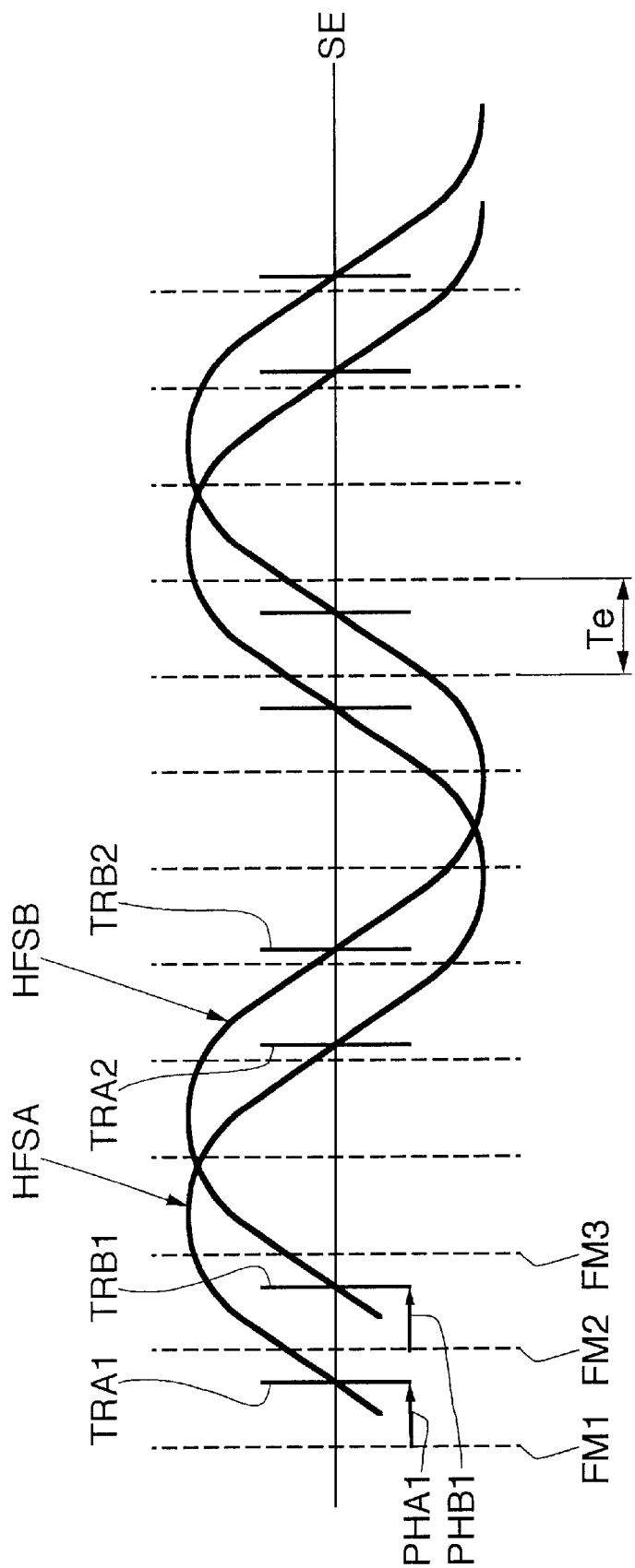
FIG. 4 is a waveform diagram illustrating the mutual phase shift between two sampled elementary signals determined by the device of FIG. 3.

An alternate embodiment of the device according to the invention is illustrated in FIG. 3. This embodiment is more particularly adapted to the determination of the mutual phase shift between two elementary signals HFSA and HFSB (as seen in FIG. 4) which together form the incident signal. A particularly interesting application for this device is disk readers, such as DVD or compact disk readers. A digital disk includes a single spiral track whose relief is representative of the binary information stored on the track of the disk. The track of the disk is illuminated by an incident optical beam, such as a laser spot, and several photodetectors (e.g., four) detect the reflection of the light beam on the disk.

The optical pickup formed by the photodetectors then delivers four base signals, respectively, from the four photodetectors, as well as an overall or useful signal equal to the sum of the four base signals. The binary information read on the track is extracted from the useful signal. The slaving of the optical beam to the track of the rotating mobile disk is performed using the four base signals delivered by the photodetectors.

Conventionally, the base signals are summed pair-wise to form two elementary signals which are sampled. The two elementary signals are mutually out of phase if the laser spot is not situated on the track. The phase difference between these two signals is then detected. This phase difference corresponds to the positioning error of the beam with respect to the track. This positioning error is then used conventionally in a servocontrol loop to modify the incident optical system and bring the optical beam back to the track and slave it thereto.

In the example illustrated in FIGS. 3 and 4, the two sampled elementary signals from which a mutual phase shift is to be determined are designated HFSA and HFSB. Only the differences between the architecture of FIGS. 1 and 3 will be described for the sake of simplification. As illustrated in FIG. 3, the means for detecting and selecting the transitions includes two elementary detection and selection means PMCA and PMCB, each of which includes a digital phase-locked loop as described above. With reference to the embodiment illustrated in FIG. 1, each means PMCA (PMCB) delivers, for each detected transition of the corresponding elementary signal, the time gap or phase PHA (PHB) of the transition with respect to the previous rising edge of the clock signal CKE, the validity information VLDA (VLDB), and the sign SGNA (SGNB) of the transition.

Moreover, as compared with the above embodiment, the device of FIG. 3 includes two assemblages CHA and CHB of at least three blocks BLC1, BLC2, BLC3. These two assemblages CHA, CHB are respectively dedicated to oppositely directed transitions. Thus, the assemblage CHA will, for example, process the rising transitions of each elementary signal, while the assemblage CHB will process the falling transitions. A multiplexing means or multiplexer MX is connected between the checking means MCT, the elementary detection, selection and calculation means PMCA and PMCB, and the two assemblages CHA and CHB. This multiplexer MX is controlled by a logic signal representative of the sign SGNA, SGNB of each transition detected.

Also, the checking means MCT selectively activates one of the two assemblages of blocks as a function of the direction of each transition detected. Each block of either of the assemblages may be identical to one of the blocks described in the assemblage CH of FIG. 1. Each block may also include an additional memory field CH12 (CH22, CH32) to store the sign of the transition detected, possibly for subsequent checking by the processing means MT. The signals RS, EVT for controlling reinitialization of the counters are also transmitted to the assemblages CHA and CHB via the multiplexer MX. The activation processing of each of the assemblages CHA and CHB is identical to that described with reference to FIG. 1.

Thus, all the rising successive transitions of the elementary signals HFSA and HFSB such as, for example, the transitions TRA1 and TRB1 (FIG. 4) will be processed in the assemblage CHA. All the successive falling transitions such as, for example, the transitions TRA2 and TRB2, will be processed in the assemblage CHB. As such, the processing means MT is able to determine the time interval between two selected successive transitions of a predetermined direction (e.g., the rising transitions). This is done based upon the values of the temporal counters of the second and third blocks of one of the assemblages (that is, based upon the values of the temporal counters CPT2A and CPT3A of the second and third blocks BLC2A and BLC3A of assemblage CHA) and the values of the time gaps or phases respectively stored in the cells of the second and third blocks of this assemblage. More precisely, in the present case, the phase shift between the transitions TRA1 and TRB1 will be obtained on the basis of the values of the temporal counters CPT2A and CPT3A and of the values PHAL and PHB1 stored in the blocks BLC2A and BLC3A.

Likewise, the processing means can determine the time interval between two successive selected transitions of the other direction (e.g., the falling transitions). Again, this is done based upon the values of the temporal counters of the second and third blocks of the other assemblage and the values the time gaps respectively stored in the cells of the second and third blocks of this other assemblage. Thus, in the present case, the phase shift determined based upon the falling transitions (e.g., the transitions TRA2 and TRB2) will be obtained based upon the values of the temporal counters CPT2B and CPT3B and the values the phases stored in the fields CH21B and CH31B. It is interesting to note here that the processing means can moreover perform a very simple check of the calculated phase shift by comparing the phase shift values respectively obtained on the basis of the two assemblages CHA and CHB.

That which is claimed is:
1. An electronic device for calculating a time interval between two selected successive transitions of a sampled incident signal with respect to a threshold and comprising:
    a detection and selection circuit for detecting and selecting transitions of the sampled incident signal;
    a calculating circuit for calculating a time gap between each selected transition and an edge of a sampling clock signal;

a unit comprising at least three blocks, each block comprising a storage cell and a counter responsive to the sampling clock signal;

a checking circuit for triggering an activation processing by said unit responsive to each current selected transition, the activation processing comprising initializing said counter of said first block, storing in said storage cell of said first block the time gap corresponding to the current selected transition, and transferring a time gap previously stored in said storage cell of said first block to said storage cell of said second block and transferring a time gap previously stored in said storage cell of said second block to said storage cell of said third block; and a processor for determining the time interval between two successive selected transitions based upon a value of each counter of said second and third blocks and the time gaps respectively stored in said storage cells of the second and third blocks.

2. The electronic device according to claim 1, wherein the sampled incident signal comprises two elementary signals.

3. The electronic device according to claim 2 wherein said detection and selection circuit comprises two elementary detection and selection circuits respectively receiving the two elementary signals and determining a direction of transitions of each elementary signal.

4. The electronic device according to claim 3 wherein each of said elementary detection and selection circuits comprises a digital phase-locked loop.

5. The electronic device according to claim 2 wherein said calculating circuit comprises two elementary calculating circuits for respectively calculating the time gap between each selected transition of the two elementary signals and an edge of the sampling clock signal.

6. The electronic device according to claim 5 wherein said unit comprises first and second units of at least three blocks respectively dedicated to transitions of opposite direction.

7. The electronic device according to claim 6 further comprising a multiplexer connected between said checking circuit, said elementary detection and selection circuits, and said first and second units and being controlled by a logic signal representative of a sign of each transition detected.

8. The electronic device according to claim 6 wherein said checking circuit selectively activates said first and second units as a function of the direction of each transition detected.

9. The electronic device according to claim 6 wherein said processor determines the time interval between two successive selected transitions of a direction based upon the values of said counters of said second and third blocks of said first unit and the time gaps respectively stored in said storage cells of said second and third blocks of said first unit.

10. The electronic device according to claim 6 wherein said processor determines the time interval between two successive selected transitions of a direction based upon the values of said counters of said second and third blocks of said second unit and the time gaps respectively stored in said storage cells of said second and third blocks of said second unit.

11. A digital disk reader comprising an electronic device for calculating a time interval between two selected successive transitions of a sampled incident signal with respect to a threshold, the electronic device comprising:

a detection and selection circuit for detecting and selecting transitions of the sampled incident signal;

a calculating circuit for calculating a time gap between each selected transition and an edge of a sampling clock signal;

a unit comprising at least three blocks, each block comprising a storage cell and a counter responsive to the sampling clock signal; and a processor for triggering an activation processing by said unit responsive to each current selected transition by initializing said counter of said first block, storing in said storage cell of said first block the time gap corresponding to the current selected transition, and transferring a time gap previously stored in said storage cell of said first block to said storage cell of said second block and transferring a time gap previously stored in said storage cell of said second block to said storage cell of said third block, and determining the time interval between two successive selected transitions based upon a value of each counter of said second and third blocks and the time gaps respectively stored in said storage cells of the second and third blocks.

12. The electronic device according to claim 11 wherein the sampled incident signal comprises two elementary signals.

13. The electronic device according to claim 12 wherein said detection and selection circuit comprises two elementary detection and selection circuits respectively receiving the two elementary signals and determining a direction of transitions of each elementary signal.

14. The electronic device according to claim 13 wherein each of said elementary detection and selection circuits comprises a digital phase-locked loop.

15. The electronic device according to claim 12 wherein said calculating circuit comprises two elementary calculating circuits for respectively calculating the time gap between each selected transition of the two elementary signals and an edge of the sampling clock signal.

16. The electronic device according to claim 15 wherein said unit comprises first and second units of at least three blocks respectively dedicated to transitions of opposite direction.

17. The electronic device according to claim 16 further comprising a multiplexer connected between said checking circuit, said elementary detection and selection circuits, and said first and second units and being controlled by a logic signal representative of a sign of each transition detected.

18. The electronic device according to claim 16 wherein said checking circuit selectively activates said first and second units as a function of the direction of each transition detected.

19. The electronic device according to claim 16 wherein said processor determines the time interval between two successive selected transitions of a direction based upon the values of said counters of said second and third blocks of said first unit and the time gaps respectively stored in said storage cells of said second and third blocks of said first unit.

20. The electronic device according to claim 16 wherein said processor determines the time interval between two successive selected transitions of a direction based upon the values of said counters of said second and third blocks of said second unit and the time gaps respectively stored in said storage cells of said second and third blocks of said second unit.

21. A method for calculating a time interval between two selected successive transitions of a sampled incident signal with respect to a threshold and comprising:

detecting and selecting transitions of the sampled incident signal;

calculating a time gap between each selected transition and an edge of a sampling clock signal;

triggering an activation processing by a first unit responsive to each current selected transition, the first unit comprising first, second, and third blocks each comprising a counter and a storage cell, the activation processing comprising
  initializing the counter of the first block;
  storing the time gap corresponding to the current selected transition in the storage cell of the first block;
  transferring a time gap previously stored in the storage cell of the first block to the storage cell of the second block and transferring a time gap previously stored in the storage cell of the second block to the storage cell of the third block; and
determining the time interval between two successive selected transitions based upon a value of the counter of the second and third blocks and the time gaps respectively stored in the storage cells of the second and third blocks.

22. The method according to claim 21, wherein the sampled incident signal comprises two elementary signals.

23. The method according to claim 22 wherein detecting and selecting comprises determining a direction of transitions of each elementary signal.

24. The electronic device according to claim 22 wherein calculating comprises calculating the time gap between each selected transition of the two elementary signals and an edge of the sampling clock signal.

25. The electronic device according to claim 24 wherein triggering comprises activating one of the first unit and a second unit also comprising first, second, and third blocks each comprising a counter and a storage cell as a function of the direction of each transition detected.

26. The method according to claim 25 wherein determining comprises determining the time interval between two successive selected transitions of a direction based upon the values of the counters of the second and third blocks of the first unit and the time gaps respectively stored in the storage cells of the second and third blocks of the first unit.

27. The method according to claim 25 wherein determining comprises determining the time interval between two successive selected transitions of a direction based upon the values of the counters of the second and third blocks of the second unit and the time gaps respectively stored in the storage cells of the second and third blocks of the second unit.

28. The method of claim 21 wherein triggering further comprises transferring a count from the counter of the first block to the counter of the second block and transferring a count from the counter of the second block to the counter of the third block.

* * * * *